United States Patent [19]

Nighan, Jr. et al.

[11] Patent Number: 5,446,749
[45] Date of Patent: Aug. 29, 1995

[54] DIODE PUMPED, MULTI AXIAL MODE, INTRACAVITY DOUBLED LASER

[75] Inventors: William L. Nighan, Jr., Menlo Park; John Cole, Sunnyvale; Thomas M. Baer, Mountain View, all of Calif.

[73] Assignee: Spectra-Physics Lasers Inc., Mountain View, Calif.

[21] Appl. No.: 191,656

[22] Filed: Feb. 4, 1994

[51] Int. Cl.[6] .................................................. H01S 3/10
[52] U.S. Cl. ............................................... 372/22; 372/41
[58] Field of Search ......................... 372/22, 41; 359/326

[56] References Cited

U.S. PATENT DOCUMENTS

| | | | |
|---|---|---|---|
| 4,656,635 | 4/1987 | Baer et al. | 372/27 |
| 4,701,929 | 10/1989 | Baer et al. | 372/71 |
| 4,884,277 | 11/1989 | Anthon et al. | 372/22 |
| 5,127,068 | 6/1992 | Baer et al. | 385/34 |
| 5,151,909 | 9/1992 | Davenport et al. | 372/22 |
| 5,164,947 | 11/1992 | Lukas et al. | 372/22 |

OTHER PUBLICATIONS

Oka, Michio et al., "Stable Intercavity Doubling of Orthogonal Linearly Polarized Modes in Diod-Pumped Nd:YAG Lasers", Optics Letters, vol. 13, No. 10, pp. 805–807, Oct. 1988.

Baer, T., "Large-amplitude Fluctuations Due to Longitudinal Mode Coupling in Diode-Pumped Intracavity-Doubled Nd:YAG Lasers", Journal of the Optical Society of America, vol. 3, No. 9, pp. 1175–1179, Sep. 1986.

Magni, et al.; Intrcavity Frequency Doubling of a CW High-Power $TEM_{00}$ Nd:YLF Laser; Dec. 15, 1993/vol. 18/No. 24/Optics Letters; Optical Society of America; pp. 2111–2113.

James, et al.; Elimination of Chaos in an Intracavity-Doubled Nd:YAG Laser; Oct. 15, 1990/vol. 15/No. 20/Optics Letters; Optical Society of America; pp. 1141–1143.

Primary Examiner—Rodney B. Bovernick
Assistant Examiner—Robert E. Wise
Attorney, Agent, or Firm—Haynes & Davis

[57] ABSTRACT

A diode pumped, multiaxial mode, intracavity frequency doubled laser resonator has high amplitude stability, meaning that the percent root mean square noise (% RMS) of the doubled output beam power is low. A diode pump source supplies a pump beam to a laser crystal positioned in a resonator cavity and produces a multiaxial mode infrared beam that is incident on a doubling crystal, also positioned in the resonator. A frequency doubled output beam is produced that has an RMS of less than 3%. The laser is highly efficient, provides high output power and its output beam is of high spatial quality.

43 Claims, 3 Drawing Sheets

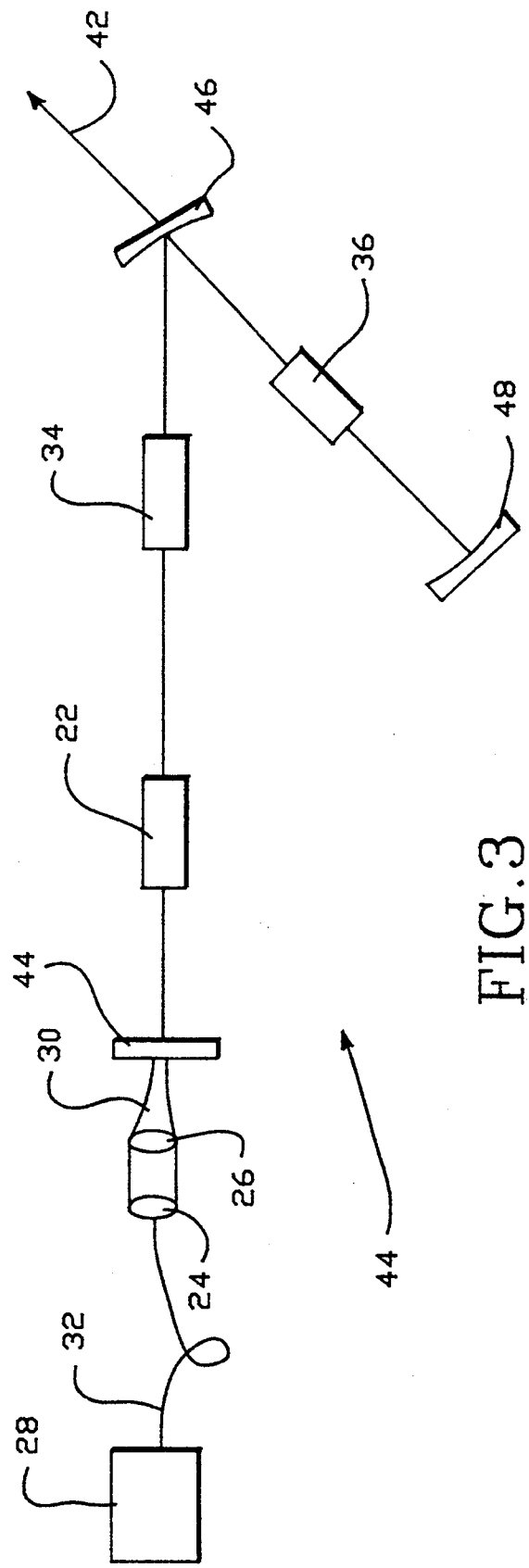
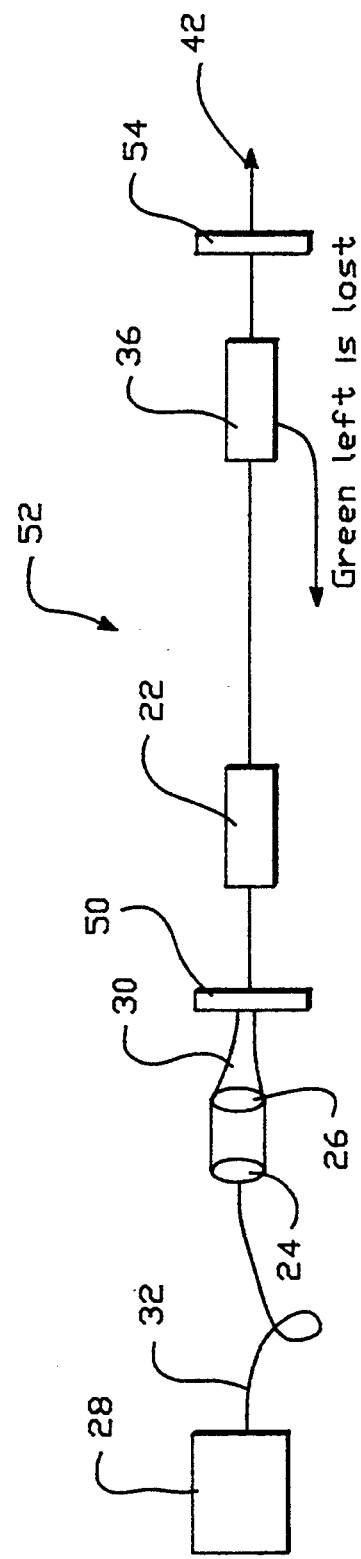
FIG. 3
FIG. 4

DIODE PUMPED, MULTI AXIAL MODE, INTRACAVITY DOUBLED LASER

FIELD OF THE INVENTION

This invention relates generally to diode pumped intracavity frequency doubled lasers, and more particularly to diode pumped intracavity frequency doubled lasers that are multiaxial mode lasers and that exhibit high amplitude stability.

BACKGROUND OF THE INVENTION

Ion lasers are relatively reliable sources of continuous wave green laser light with low amplitude noise and provide output power at the multiple watt level, but these devices convert electrical power into optical power with efficiencies of only a small fraction of one percent. There are many applications that would benefit from the development of a highly efficient, low cost, diode pumped, continuous wave, solid state green laser source, also at the multiple watt level and with comparable amplitude stability.

Certain fundamental difficulties with intracavity frequency doubled lasers were discovered and numerically modeled in early work by Baer. See for example T. Baer, J.Opt. Soc. Am. B., Vol. 3, No. 9, pp. 1175–1180 (1986), and U.S. Pat. Nos. 4,656,635 and 4,701,929. It was reported and disclosed that large amplitude fluctuations are observed on the green output beam and the intracavity laser beam when a frequency doubling crystal like KTP is introduced into an otherwise amplitude stable multiaxial mode diode pumped Nd:YAG laser. It was also reported that the large amplitude noise on the green output beam disappears when an appropriate etalon is placed in the laser cavity that forces single axial mode oscillation. In the multiaxial mode case, where 2 to 4 modes were oscillating, the green output power was seen to fluctuate with up to 100% modulation depth. Baer's experimental work and theoretical model indicated that the insertion of a frequency doubling crystal in this multiaxial mode laser resulted in nonlinear coupling of the loss of the axial modes via sum frequency generation. A high peak power in one axial mode induced a high nonlinear loss for the other axial modes, and caused an unexpected and undesirable pulsing effect.

As an example of the effect described by Baer, a laser with two infrared axial modes generated three green frequencies; two were doubled modes and the other a sum frequency mode. The sum frequency process couples the two infrared axial modes in a way that can cause them to switch on and off in a sequential fashion. The typical period of this mode coupling was found to be a function of the magnitude of the nonlinear conversion. For weak conversion, the period was short and the modes minimally modulated. For stronger conversion, the mode coupling period lengthened, and the modes switched on and off in pulses of high peak power, completely out of phase with each other. The noise spectrum of such a laser typically showed substantial peaks in the 10 to hundreds of kilohertz range for either the green or infrared, and corresponded to considerable amplitude fluctuations.

A source with this type of amplitude modulation is not as generally useful as one with low amplitude noise. As an example, for applications in opthamology, amplitude stability is required on the time scale of the typical exposure durations for accurate control of therapeutic effects. Another example is the use of a green laser as a pump for a second laser, such as a dye or $Ti:Al_2O_3$ laser. Deep amplitude modulation at certain frequencies can cause undesirable amplitude modulations on the output of the second laser.

A number of methods for stabilizing the intracavity frequency doubled output of a diode pumped solid state laser have been described and demonstrated. The most common materials have been Nd:YAG as a laser medium and KTP as a nonlinear (doubling) medium. For this reason, the most common type of phase matching is Type II. Techniques that have been used in attempt to stabilize the frequency doubled output from such systems have included insertion of intracavity quarter wave plates (see M. Oka, and S. Kubota, Opt. Lett. 13, 805 (1988)), optical cavity temperature control (see U.S. Pat. No. 4,884,277 issued to Anthon et al. on Nov. 28, 1989) and forcing single frequency operation (see U.S. Pat. No. 5,164,947 issued to G. J. Lukas et al. on Nov. 17, 1992). While all of these techniques have demonstrated regimes of operation where the frequency doubled output is measured to have low amplitude noise, in all cases the techniques are difficult to implement in a reliable, low cost fashion that is resilient to changes in environmental conditions, such as temperature. The techniques employed typically must maintain an inherently amplitude-unstable system within the narrow range of parameter space for which the system is stable.

It would be highly desirable to provide an amplitude stable, intracavity frequency doubled laser that does not require active stabilization or single axial mode operation. Additionally, there is a need for a laser of this type that remains stable over a range of environmental conditions, such as changes in ambient temperature.

SUMMARY OF THE INVENTION

It is an object of the invention to provide a diode pumped, multiaxial mode, intracavity frequency doubled laser with high amplitude stability.

Another object of the invention is to provide a diode pumped, multiaxial mode, intracavity frequency doubled laser with a percent root mean square noise (% RMS) of less than about 3% over a wide range of operating parameters.

Another object of the invention is to provide a diode pumped, multiaxial mode, intracavity frequency doubled laser that is highly efficient.

Another object of the invention is to provide a diode pumped, multiaxial mode, intracavity frequency doubled laser that provides high output power.

Another object of the invention is to provide a diode pumped, multiaxial mode, intracavity frequency doubled laser with high amplitude stability which operates with at least on the order of 10 axial modes, and as many as on the order of 100 axial modes.

Yet another object of the invention is to provide a diode pumped, multiaxial mode, intracavity frequency doubled laser with high amplitude stability that produces a green output.

These and other objects of the invention are achieved in a diode pumped, multiaxial mode, intracavity frequency doubled laser with high amplitude stability. A laser crystal and a doubling crystal are positioned in a laser resonator. A diode pump source supplies a pump beam to the crystal and produces an infrared laser beam that is incident on the doubling crystal. A plurality of infrared beam axial modes oscillate, spaced apart in frequency by multiples of the axial mode spacing c/2L, where c is the speed of light and L is the optical length of the resonator. A frequency doubled output beam at nominally double the optical frequency of the infrared beam is generated. The doubled output beam is also composed of a large number of modes of closely spaced frequencies, and the total doubled output beam has a percent RMS noise of less than about 3% as measured in a range from 10 Hz to 10 MHz. The total number of green modes is typically larger than the number of infrared axial modes, since sum frequency generation occurs as well. In spite of this, the green beam is typically referred to in the prior art as a "frequency doubled" beam, rather than a "frequency doubled and sum frequency" beam since all of the green wavelengths are very close to each other in magnitude. We will use the same terminology. In the case of a neodymium doped host, the frequency doubled beam wavelength is typically green, since the infrared laser beam wavelength that is generated is typically on the order of 1.04 to 1.064 μm. Those of ordinary skill in the art will realize that the disclosed techniques can also apply to frequency doubled wavelengths that are blue, red, and near infrared, since neodymium hosts have been demonstrated to produce infrared beams of wavelengths near 0.95 μm, 1.3 μm, and 1.45 μm.

A large number of axial modes oscillate, with as few as on the order of 10 and as many as on the order of 200. With this configuration, the relative power in each axial mode is smaller than in the case of 2 to 4 axial modes. The relative magnitude of the nonlinear coupling of the axial modes is therefore reduced. However, the statistical probability of coupling of one mode to another mode via sum frequency generation is increased, since the number of modes is increased. In the embodiment, none of the characteristic spiking behavior (as observed by Baer in early work) is observed for any of the individual axial modes of the large number that is oscillating. This indicates that in the present embodiment, no one axial mode is able to reach a high peak power and induce a high nonlinear loss for the other axial modes. It was this effect that caused the large amplitude fluctuations in the early 2–4 axial mode devices studied by Baer. In this embodiment, unlike any prior ad, the oscillation of a large number of axial modes result in a highly amplitude stable output beam.

In one embodiment, fiber-bundle-coupled diode bars are used to longitudinally pump Nd:YLF crystal with up to 9W per crystal. This pump source is described in U.S. Pat. No. 5,127,068, issued to Baer et al. on Jun. 30, 1992. Output power is extracted from the laser resonator by intracavity frequency doubling. The nonlinear crystal can be lithium triborate, or LBO, and Type I noncritical phase matching (NCPM) can be used. The output power is typically on the order of 2W or greater for 16W of incident pump light from a single 20W cw diode laser bar. This corresponds to an optical efficiency ($P_{out}/P_{incident}$) of approximately 12.5%. Including a fiber bundle transfer efficiency of 85% and a diode electrical power to optical efficiency of 40%, the electrical diode power to optical efficiency of the intracavity frequency doubled laser is on the order of 4.25%. This is a large number in comparison to small fraction one percent that is typical for green ion laser sources.

The output green beam is substantially round since Type I, non critical phase matching (NCPM) is employed, which provides a large acceptance angle and minimizes walk-off, as will be recognized by those of ordinary skill in the art. The phase matching and doubling efficiency are optimized by optimizing the crystal temperature in the vicinity of 160° to 175 ° C. In certain embodiments, the green beam and infrared beam are nearly diffraction limited, and the RF noise spectrum shows no heterodyne peaks other than the primary c/2L peak at about 140 MHz. This indicates that the laser oscillates on its lowest order spatial mode.

The laser of the present invention can have a % RMS noise of 3% or less, preferably 2% or less, and most preferably less than 1%.

DETAILED DESCRIPTION OF THE DRAWINGS

FIG. 3 is a schematic diagram of a single port, diode pumped, multiaxial mode, intracavity frequency doubled laser with high amplitude stability.

FIG. 4 is a schematic diagram of a single port, diode pumped, multiaxial mode, intracavity frequency doubled laser with high amplitude stability where a portion of the generated frequency doubled light is lost.

DETAILED DESCRIPTION OF THE PREFERRED EMBODIMENTS

For the purposes of the following description of the invention, the following definitions are used:

a "high power" frequency doubled output as a power greater than 300 mW.

a "high optical efficiency" as an optical efficiency ($P_{out}/P_{incident,diode}$) that is greater than 5%.

a "high electrical to optical efficiency" for a diode pumped intracavity frequency doubled laser as an efficiency ($P_{out}/P_{electrical,diode}$) greater than 1%.

a "multiaxial" mode intracavity frequency-doubled laser as a laser where on the order of 10 or more axial modes are oscillating at the fundamental infrared wavelength in the laser resonator.

a "highly amplitude stable" intracavity frequency doubled laser, or the same laser with "high amplitude stability" as one where the percent root mean square (% RMS) noise from 10 Hz to 10 MHz is less than 3%.

The diode pumped, multiaxial mode intracavity doubled laser of the present invention includes a laser crystal and a doubling crystal positioned in a resonator cavity. This laser is highly amplitude stable, and the frequency doubled output beam is of high power. A diode pump source supplies a pump beam to the laser crystal and produces an infrared laser crystal beam at a plurality of axial modes that is incident upon the doubling crystal, producing a frequency doubled output beam, also at a plurality of optical frequencies. The output beam is highly amplitude stable, meaning that the %RMS noise is less than 3%, preferably less that 2%, and most preferably less than 1%. The laser is highly optically efficient, with an optical efficiency greater than 5% and preferably greater than 12%. The laser is highly electrical efficient, with an electrical efficiency greater than 1%, and preferably greater than 4%. The frequency doubled beam is of high optical quality, which means that a substantial fraction of its power is nearly diffraction limited.

Figure 1:
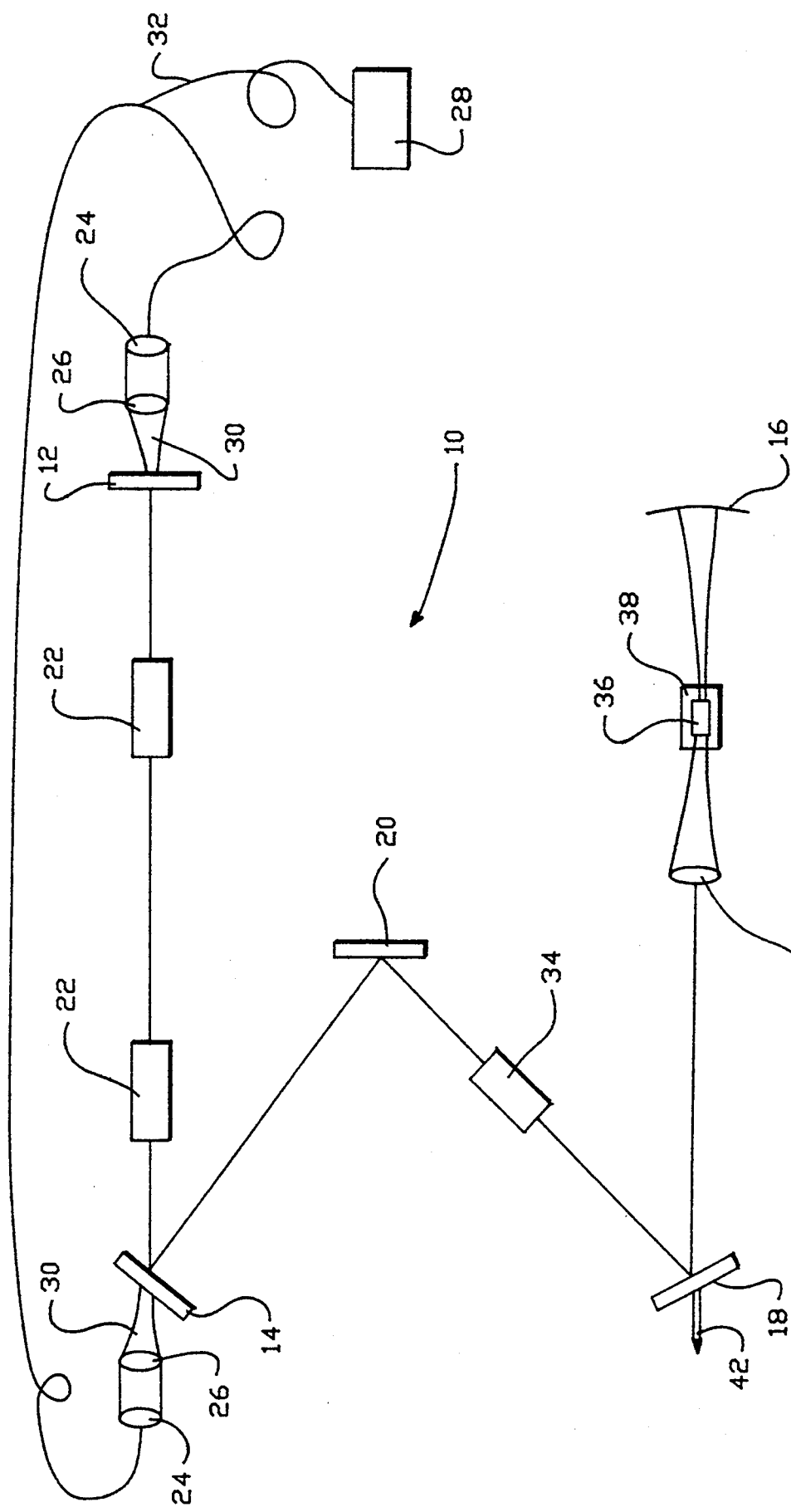
FIG. 1 is a schematic diagram of a multi-port, diode pumped, multiaxial mode, intracavity doubled laser resonator with high amplitude stability.

In FIG. 1, a bounded, standing wave resonator 10 for 1053 nm is illustrated. Resonator 10 is multi-port and diode pumped with four arms, each arm with its own optical axis. The first arm is defined by a high reflector 12, which is highly reflecting at 1053 nm and highly transmissive at a pump wavelength of 797 nm, and a high reflector 14, which is highly reflecting at 1053 nm and highly transmissive at 797. The distance between reflectors 12 and 14 is L1. The second arm of resonator 10 is defined by a high reflector 16, highly reflecting at 1053 nm, and highly reflecting at 527 nm, and an output coupler 18, highly reflecting at 1053 nm and highly transmissive at 527 nm. It has a length of L2. The third arm, with a length of L3, is defined by high reflector 14 and a high reflector 20, which is highly reflecting at 1053 nm. High reflector 20 is, essentially, a fold mirror. The fourth arm, with a length of L4, is defined by high reflector 20 and output coupler 18. An optical Brewster plate 34 can be placed in this arm. Although the optical elements in this embodiment are specific for 1053 nm, 797 nm and 527 nm, it will be appreciated that the optical elements can have other transmission and reflectivity characteristics, depending on pump source, laser crystal and doubling crystal.

The length of resonator 10 is L, and it equals the total lengths of the four arms. One or more laser crystals 22 are positioned in the first arm along its optical axis. Suitable crystals include but are not limited to Nd:YLF, Nd:YAG, Nd:YVO4, Nd:GVO4, Nd:YPO4, Nd:BEL, Nd:YALO and Nd:LSB. A preferred crystal material is Nd:YLF. Positioned adjacent to reflectors 12 and 14 are a pair of lenses 24 and 26, arranged in a telescope configuration. A diode pump source 28 produces a pump beam 30 that is focussed to a desired size by lenses 24 and 26. The telescope arrangement provides for the focussing of pump beam 30 from a diode source 28. The size of the pump beam is optimized with lenses 24 and 26 to avoid fracture of incident faces of crystals 22 while increasing useful pump power. The TEM00 mode size diameter of the infrared beam in the laser crystals is about 1 millimeter.

Diode pump source 28 can be a single diode, spatial emitter, diode bar or a plurality of diodes or diode bars. A suitable diode source 28 is model No. OPC-A020-797-CS, available from OptoPower Corporation, City of Industry, Calif. Preferred wavelengths of diode pump source 28 are in the range of 795 to 815 nm. Wavelengths of specific laser crystals 22 are as follows: Tm:YAG - 785 nm; Nd:YLF - 797; and Nd:YAG, Nd:YVO4 - 809 nm.

In the embodiment of FIG. 1, two laser crystals 22 are end pumped. It is possible to include only one crystal and pump both sides, or alternatively, pump only one side of a single crystal 22. As shown in FIG. 1, a single diode pump source 28 is used. Separate pump sources can be used for each end of the first arm of resonator 10.

Diode pump source 28 is coupled to one or more optical fibers 32. Preferably, a bundle of optical fibers 32 are utilized. Suitable fibers include but are not limited to those that have silica cores with silica cladding. Coupling of optical fibers 32 to diode pump source 28 can be achieved as taught in U.S. Pat. No. 5,127,068.

Optionally included in resonator 10 is a Brewster plate 34, which can be used to insure operation at a particular polarization. Brewster plate 34 can be positioned along the optical axis of either the third or fourth arms. A doubling crystal 36 is positioned in the second arm. In one embodiment, doubling crystal 36 is LBO. Other suitable doubling crystals include KTP, KDP, BBO, LIO, LiNbO3, and KNbO3. When LBO is used, a heating element 38 is included. A suitable heating element 38 is a resistive heater or a thermoelectric device as available from Melcor, Trenton, N.J. 08648.

LBO doubling crystal 36 is used in a Type I, non-critical-phase-matched (NCPM) geometry, where the phase-matching is controlled with temperature, typically about 160° to 175° C. The high acceptance angle of non-critical-phase-matching (NCPM) in the LBO doubling crystal 36 allows resonator 10 to be adjusted in a manner that yields high beam quality and neady TEM00 operation. Other types of phase matching do not preserve beam quality upon tight focussing, which can cause multi-spatial mode behavior.

High amplitude stability is maintained for tilting of the LBO crystal to either side of normal, for translation of the Z position of the LBO doubling crystal 36 and/or high reflector 16, and temperature tuning the LBO by ±3° C. of the optimum temperature. These adjustments sacrifice a small amount of useful output power of resonator 10.

Pump beam 30 passes through laser crystals 22 and an infrared laser crystal beam is created. The laser crystal beam is then incident upon a face of LBO crystal 36. However, a small waist, on the order of about 50 μm diameter or less, is preferably generated inside LBO doubling crystal 36 in order to produce a very high intensity infrared beam within LBO crystal 36. High intensity is needed because the conversion of infrared to green increases nonlinearly (as the square) with the infrared intensity. The infrared laser crystal beam is focussed to the much smaller waist diameter by the inclusion of a lens 40 between output coupler 18 and LBO doubling crystal 36 and by the use of a high reflector 16 that has focussing powers. A suitable lens 40 is antireflection coated at the infrared and doubled wavelength, and is of focal length 30 to 50 mm. High reflector 16 has a radius of curvature, R1 of about 100 mm.

The infrared laser crystal beam, for Nd:YLF it is 1053 nm, travels in two directions in the fourth arm of resonator 10. It travels from output coupler 18 through lens 40 and LBO doubling crystal 36 to high reflector 16, and is reflected from high reflector 16 back through the doubling crystal. An output beam at 527 nm is generated. Because output coupler 18 is highly transmissive at 527, an output beam 42 at 527 nm is generated by resonator 10. 527 nm light is generated in the fourth arm in two directions, relative to LBO doubling crystal 36, 527 nm light in the right hand direction, and 527 nm light in the left hand direction. The positioning of LBO doubling crystal 36 in the fourth arm between output coupler 18 and high reflector 16 creates a double pass geometry because 527 nm light is generated in both directions, and output beam 42 is the sum of these beams.

In one embodiment using resonator 10 of FIG. 1, fiber-bundle-coupled diode bars are used for diode source 28 to longitudinally pump Nd:YLF laser crystals 22 with up to 8 W per Nd:YLF crystal. Useful output power is extracted via intra cavity frequency doubling and can result in more than 2W output power at 527 nm for 16W of incident pump light from a single 20W cw diode laser bar. Output beam 42 is substantially round and is of high quality. Doubling efficiency can be fine tuned by varying the temperature of LBO doubling crystal 36 from a preferred temperature of about 160° to 175° C. Both the 527 nm output beam 42 and the infrared laser crystal beam are nearly diffraction-limited. The RF spectrum indicates that under certain conditions substantially no heterodyne peaks other than the c/2L peak at nearly 140 MHz are present, indicating that resonator 10 is oscillating on its lowest order spatial mode.

In this embodiment, resonator 10 has a length L of about 1m. L is equal to the total of L1, L2, L3 and L4. Additionally, resonator 10 exhibits the lowest amplitude noise when resonator alignment, LBO doubling crystal 36 angle, and LBO doubling crystal 36 temperature are adjusted in a way that results in primarily a single peak at the c/2L frequency in the RF spectrum. LBO doubling crystal 36 can be slightly off of normal incidence with respect to the cavity mode for this effect. In this state, the % RMS noise is as low as less than 3%, preferably less than 2%, and most preferably less than about 1%, as measured by an RMS meter over a range of 10 Hz to 10 MHz.

Additionally, in this embodiment, the optical spectrum of resonator at both the 527 nm output beam and the 1053 nm laser crystal beam indicates that at least 10 axial modes are oscillating at any one time, and as many as ~100 or more axial modes may be oscillating. The bandwidth of the intracavity infrared laser beam is about 35 GHz while 527 nm is produced, indicating that 100–200 axial modes can oscillate, and for certain alignment configurations the optical spectrum can have a structure indicating that the LBO doubling crystal 36 may be acting like an etalon. With the LBO doubling crystal 36 removed, the infrared axial mode spectrum stabilizes, with about 10 axial modes oscillating, and a bandwidth of about 30 GHz. The c/2L mode spacing is about 150 MHz for a 1m resonator cavity 10. The 527 nm output beam 42 has a bandwidth of about >70 GHz.

As more infrared power from laser crystals 22 is generated, more frequency doubled output power can be obtained. Additional pumping ports and pump sources or other laser crystals, such as Nd:YVO4 can facilitate scaling. To achieve high amplitude stability, we find that a large number of infrared axial modes must oscillate. With ND:YLF as the active medium, this was achieved with the ~1 meter long cavity. The cavity length (or resonator length) of diode pumped resonators for intracavity doubling of the prior art were typically very shod, at typically less than 10 cm. Short lengths increase c/2L axial mode spacing, and therefore typically decrease the number of axial modes that can oscillate within the available bandwidth of the laser crystals. Another technique for broadening bandwidth would utilize a broad bandwidth material, like Nd:LMA.

Resonator 44, illustrated in FIG. 3, has a simpler geometry than resonator 10 of FIG. 1. Resonator 44 includes a first arm that is defined by a high reflector 44 and an output coupler 46. Positioned along an optical axis of the first arm is laser crystal 22. A diode pump source 28 delivers pump beam 30 through optical fiber 32, or a bundle of fibers. Lenses 24 and 26 focus pump beam 30 so it is incident on laser crystal 22, and a laser crystal beam is produced. The second arm of resonator 44 is defined by output coupler 46 and a high reflector 48. Resonator 44 has a length L that is equal to the total lengths of the first and second arms. Positioned along an optical axis of the second arm is a doubling crystal 36.

An optional Brewster plate 34 is positioned included in resonator 44, and positioned in the first arm.

Figure 2:
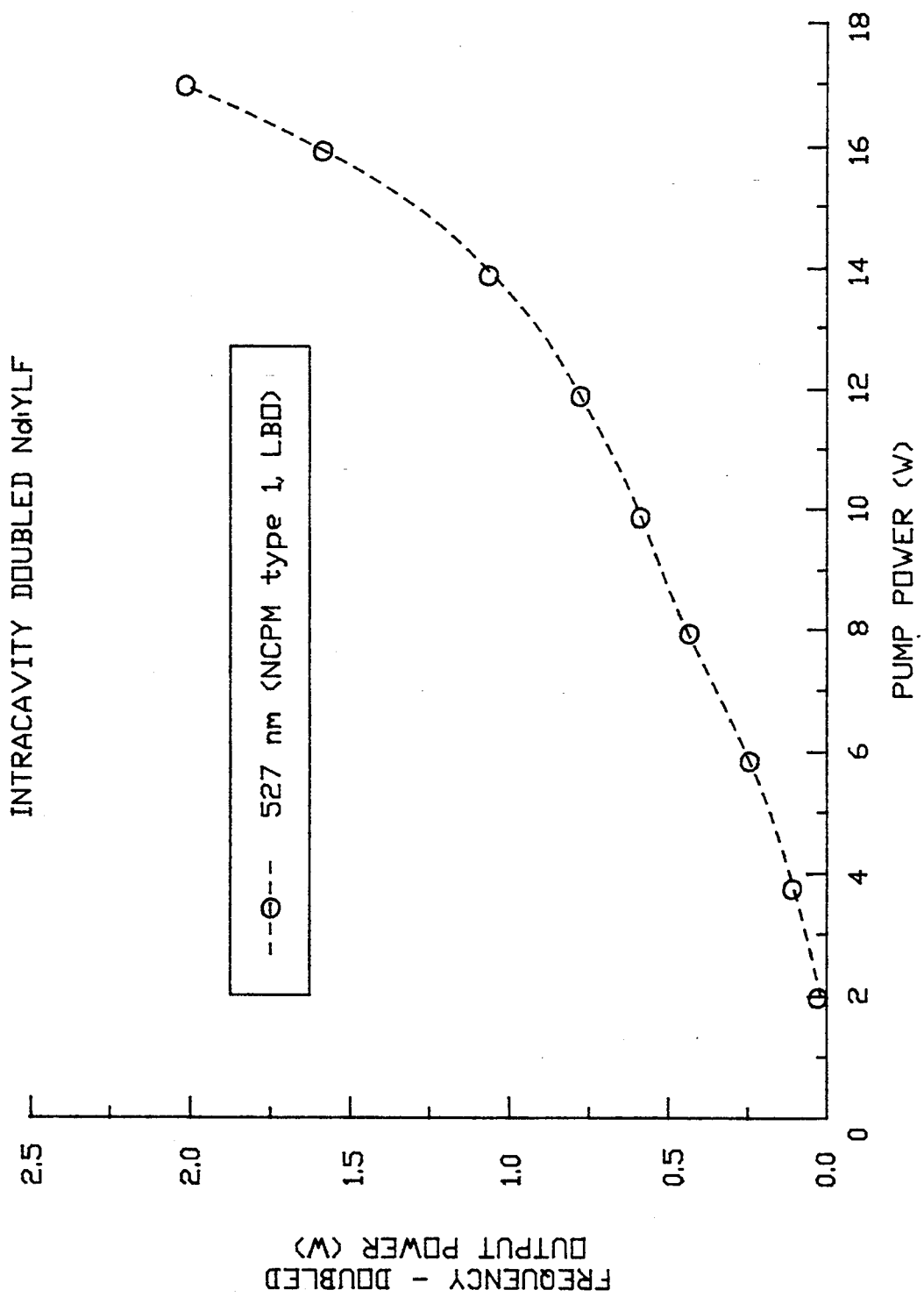
FIG. 2 is a graph illustrating frequency doubled output power as a function of incident optical input power of the laser resonator shown in FIG. 1.

Laser crystal beam is reflected from output coupler 46 and is incident on doubling crystal 36. The second arm provides a double pass geometry for the generation of the frequency doubled output beam 42. If LBO is used as doubling crystal 36, then a heating element, not shown, is necessary. Additionally not illustrated in FIG. 2 is a lens disposed between doubling crystal 36 and output coupler 46. Inclusion of the lens is dependent on the type of doubling crystal 36 used, and on the radius of curvature and focussing ability, of high reflector 48 and output coupler 46.

Resonator 52, shown in FIG. 4, does not include fold arms. Resonator 52 does not provide for a double pass geometry of the infrared beam through doubling crystal 36, and a portion of frequency doubled output beam 42 is lost in resonator 52. Again, through doubling crystal 36 frequency doubled output beam 42 is generated in both directions. However, with resonator 52, the portion of frequency doubled output beam 42 traveling to the left of doubling crystal 36 is lost.

The present invention is a diode pumped, multi axial mode, intra-cavity doubled laser with low amplitude noise. This is created by oscillating a plurality of axial modes, such as 10, and in some instances ~100. In one embodiment, a long resonator structure creates the multi axial modes. The length of the resonator can be in the range of 0.3m to 2m. Other techniques can also be used to insure multiaxial mode operation. For example the laser crystal 22 can be positioned as close as possible to one end of the resonator, taking advantage of the effects of spatial hole burning which is maximized as laser crystal 22 is moved close to an end. Additionally, a high reflecting coating can be place on laser crystal 22. Laser crystal 22 materials with broad bandwidths, on the order of a few hundreds of $GU_2$, can also be used to generate the many axial modes.

Although a green output beam has been described, blue, red, near infrared and beams of other wavelengths are possible, depending on the choice of laser and doubling crystals.

Changes and modifications in the specifically described embodiments can be carried out without departing from the scope of the invention which is intended to be limited only by the scope of the appended claims.

What is claimed is:

1. A diode pumped, multi axial mode, intracavity doubled laser, comprising:
   at least two resonator mirrors defining a resonator cavity;
   a laser crystal positioned in the resonator cavity;
   a doubling crystal positioned in the resonator cavity;
   a diode pump source supplying a pump beam to the laser crystal and producing a laser crystal beam with a plurality of axial modes that is incident on the doubling crystal to produce a frequency doubled output beam, the resonator cavity providing a sufficient number of axial modes to oscillate so that the doubled output beam has a RMS noise of less than 3%; and
   a power supply supplying power to the diode pump source.

2. The laser of claim 1, wherein the resonator cavity has a length L of sufficient length to produce the doubled output beam having the % RMS noise of less than 3%.

3. The laser of claim 1, wherein the resonator cavity has a length L of sufficient length to produce at least 10 axial modes in the resonator cavity.

4. The laser of claim 1, wherein the resonator cavity has a length L of sufficient length to produce 100 or more axial modes in the resonator cavity.

5. The laser of claim 1, wherein the resonator cavity has a length of about 1m.

6. The laser of claim 1, wherein the laser crystal has a sufficient broad based bandwidth to produce the doubled output beam having a % RMS noise of less than 3%.

7. The laser of claim 1, wherein the laser crystal is selected from the group consisting of Nd:YLF, Nd:YVO4, Nd:YAG, and Nd:LMA.

8. The laser of claim 1, wherein the laser crystal is Nd:YLF.

9. The laser of claim 1, wherein the doubling crystal is LBO.

10. The laser of claim 10, further including a device to heat the LBO crystal in the resonator.

11. The laser of claim 10, wherein the LBO crystal is heated for phase matching.

12. The laser of claim 10, wherein the laser crystal beam is focused and incident on the LBO crystal to a diameter of less than half a diameter of the LBO crystal.

13. The laser of claim 1, wherein the doubled output beam has a % RMS noise of less than 2%.

14. The laser of claim 1, wherein the doubled output beam has a % RMS noise of less than 1%.

15. The laser of claim 1, wherein the doubled output beam has a wavelength of about 527 nm.

16. A diode pumped, multi axial mode, intracavity doubled laser, comprising:
a first resonator mirror and a second resonator mirror defining a resonator of length L and the resonator including an output coupler, the output coupler being positioned to define a first arm of the resonator of length L1 between the first resonator mirror and the output coupler with a first optical axis, and a second arm of the resonator of length L2 between the output coupler and the second resonator mirror with a second optical axis;
a laser crystal positioned in the first arm of the resonator along the first optical axis;
a doubling crystal positioned in the second arm of the resonator along the second optical axis;
a diode pump source supplying a pump beam to the laser crystal and producing a laser crystal beam with a plurality of axial modes that is incident on the doubling crystal to produce a frequency doubled output beam, the length L of the resonator cavity being selected to provide a sufficient number of axial modes to oscillate and the doubled output beam has an RMS of less than 3%; and
a power supply supplying power to the diode pump source.

17. The laser of claim 16, wherein the length L of the resonator cavity is of sufficient length produce the doubled output beam having the RMS of less than 3%.

18. The laser of claim 16, wherein the length L of the resonator cavity is of sufficient length to produce 100 or more axial modes in the resonator cavity.

19. The laser of claim 16, wherein L is about 1m.

20. The laser of claim 16, wherein the laser crystal is selected from the group consisting of Nd:YLF, Nd:YVO4, Nd:YAG, and Nd:LMA.

21. The laser of claim 16, wherein the laser crystal is Nd:YLF.

22. The laser of claim 16, wherein the doubling crystal is LBO.

23. The laser of claim 16, further including a device to heat the LBO crystal in the resonator.

24. The laser of claim 23, wherein the LBO crystal is heated for phase matching.

25. The laser of claim 23, wherein the laser crystal beam is focused and incident on the LBO crystal to a diameter of less than half a diameter of the LBO crystal.

26. The laser of claim 16, wherein the doubled output beam has a % RMS noise of less than 2%.

27. The laser of claim 16, wherein the doubled output beam has a % RMS noise of less than 1%.

28. The laser of claim 16, wherein the doubled output beam has a frequency of about 527 nm.

29. A multi port, diode pumped, multi axial mode, intracavity doubled laser, comprising:
a first resonator mirror and a second resonator mirror defining a resonator of length L, the resonator including a third resonator mirror positioned to define a first arm of the resonator of length L1 between the first resonator mirror and the third resonator mirror with a first optical axis, an output coupler positioned to define a second arm of the resonator of length L2 between the output coupler and the second resonator mirror with a second optical axis, a fold mirror positioned to define a third arm of the resonator of length L3 between the third resonator mirror and the fold mirror with a third optical axis, and a fourth arm of the resonator of length L4 between the fold mirror and the output coupler with a fourth optical axis;
a laser crystal positioned in the first arm of the resonator along the first optical axis;
a doubling crystal positioned in the second arm of the resonator along the second optical axis;
a first diode pump source, positioned adjacent to the first resonator mirror, supplying a first pump beam to the laser crystal, and a second diode pump source, positioned adjacent to the third resonator mirror supplying a second pump beam to the laser crystal, the first and second pump beams pumping the laser crystal to create a laser crystal beam that is incident on the doubling crystal to produce a frequency doubled output beam with a plurality of axial modes, and the resonator cavity is of sufficient length to produce at least 10 axial modes in the resonator cavity and the doubled output beam has an RMS of less than 3%; and
a power supply supplying power to the diode pump sources.

30. The laser of claim 29, wherein the length L of the resonator cavity is of sufficient length to produce the doubled output beam having the % RMS noise of less than 3%.

31. The laser of claim 29, wherein the length L of the resonator cavity is of sufficient length to produce 100 or more axial modes in the resonator cavity.

32. The laser of claim 29, wherein L is about 1m.

33. The laser of claim 29, wherein the laser crystal is selected from the group consisting of Nd:YLF, Nd:YVO4, Yd:YAG, Nd:LMA.

34. The laser of claim 29, wherein the laser crystal is Nd:YLF.

35. The laser of claim 29, wherein the doubling crystal is LBO.

36. The laser of claim 35, further including a device to heat the LBO crystal in the resonator.

37. The laser of claim 35, wherein the LBO crystal is heated for phase matching.

38. The laser of claim 35, wherein the laser crystal beam is focused and incident on the LBO crystal to a diameter of less than half a diameter of the LBO crystal.

39. The laser of claim 29, wherein the doubled output beam has a % RMS noise of less than 2%.

40. The laser of claim 29, wherein the doubled output beam has a wavelength of about 527 nm.

41. The laser of claim 29, further including a Brewster angle plate positioned in the third or fourth arms of the resonator along the third or fourth optical axes.

42. The laser of claim 29, wherein a double pass geometry is created in the second arm to generate the frequency doubled output beam in a first direction between the doubling crystal and the second resonator mirror, and a second direction between the doubling crystal and the output coupler.

43. The laser of claim 29, further comprising a second laser crystal positioned in the first arm along the first optical axis between the first laser crystal and the first resonator mirror.

* * * * *